US011993675B2

(12) United States Patent
Bhagat et al.

(10) Patent No.: US 11,993,675 B2
(45) Date of Patent: May 28, 2024

(54) LEWIS ACID POLYMERIZATION CATALYST

(71) Applicants: Dow Global Technologies LLC, Midland, MI (US); Northwestern University, Evanston, IL (US)

(72) Inventors: Mihir Bhagat, Evanston, IL (US); Charmaine Bennett, Evanston, IL (US); Youlong Zhu, West Lafayette, IN (US); SonBinh T. Nguyen, Evanston, IL (US); Linda Broadbelt, Glenview, IL (US); Justin M. Notestein, Evanston, IL (US); Matthew E. Belowich, Midland, MI (US); Arjun Raghuraman, Pearland, TX (US); William H. Heath, Lake Jackson, TX (US); Sukrit Mukhopadhyay, Midland, MI (US); Heather A. Spinney, Midland, MI (US); David R. Wilson, Midland, MI (US)

(73) Assignees: Dow Global Technologies LLC, Midland, MI (US); Northwestern University, Evanston, IL (US)

( * ) Notice: Subject to any disclaimer, the term of this patent is extended or adjusted under 35 U.S.C. 154(b) by 500 days.

(21) Appl. No.: 17/433,045

(22) PCT Filed: Feb. 14, 2020

(86) PCT No.: PCT/US2020/018368
§ 371 (c)(1),
(2) Date: Aug. 23, 2021

(87) PCT Pub. No.: WO2020/176277
PCT Pub. Date: Sep. 3, 2020

(65) Prior Publication Data
US 2022/0251283 A1 Aug. 11, 2022

Related U.S. Application Data

(60) Provisional application No. 62/809,938, filed on Feb. 25, 2019.

(51) Int. Cl.
C08G 65/26 (2006.01)
C08G 18/10 (2006.01)
C08G 18/48 (2006.01)
C08G 65/00 (2006.01)

(52) U.S. Cl.
CPC ............ *C08G 18/48* (2013.01); *C08G 18/10* (2013.01); *C08G 65/005* (2013.01); *C08G 65/2609* (2013.01); *C08G 65/2654* (2013.01); *C08G 65/266* (2013.01)

(58) Field of Classification Search
CPC ............ C08G 65/005; C08G 65/2609; C08G 65/2654; C08G 65/266
See application file for complete search history.

(56) References Cited

U.S. PATENT DOCUMENTS 9,388,271 B2 * 7/2016 Nakaminami ....... C08G 18/485

FOREIGN PATENT DOCUMENTS

| EP | 1340780 A1 * | 9/2003 | ............. C07F 17/00 |
|---|---|---|---|
| JP | 2008255144 A | 10/2008 | |
| JP | 2015196648 A | 11/2015 | |
| WO | 2002057209 A1 | 7/2002 | |
| WO | 2019055725 A1 | 3/2019 | |
| WO | 2019055727 A1 | 3/2019 | |
| WO | 2019055731 A1 | 3/2019 | |
| WO | 2019055734 A1 | 3/2019 | |

OTHER PUBLICATIONS

PCT/US2020/018368, International Search Report and Written Opinion with a mailing date of Jun. 19, 2020.
PCT/US2020/018368, International Preliminary Report on Patentability with a mailing date of Aug. 25, 2021.

* cited by examiner

*Primary Examiner* — Michael L Leonard

(57) ABSTRACT

A method of producing a polyether alcohol that includes feeding an initiator into a reactor, feeding one or more monomers into the reactor, feeding a polymerization catalyst into the reactor, the polymerization catalyst being a Lewis acid catalyst having a general formula $M(R^1)_1(R^2)_1(R^3)_1(R^4)_{0\ or\ 1}$, separate from feeding the initiator into the reactor, feeding a hydrogen bond acceptor additive into the reactor, the hydrogen bond acceptor additive being a $C_2$ to $C_{20}$ organic molecule having at least two hydroxyl groups, of which two hydroxyl groups are situated in 1,2-, 1,3-, or 1,4-positions on the organic molecule, and allowing the initiator to react with the one or more monomers in the presence of the polymerization catalyst and the hydrogen bond acceptor additive to form a polyether alcohol having a number average molecular weight greater than a number average molecular weight of the initiator.

10 Claims, No Drawings

LEWIS ACID POLYMERIZATION CATALYST

FIELD

Embodiments relate to an additive for a Lewis acid polymerization catalyst, methods of manufacturing alcohols using at least the additive and Lewis acid polymerization catalyst, alcohols prepared using at least the additive and Lewis acid polymerization catalyst, and/or polyurethane products prepared using the alcohols prepared using at least the additive and Lewis acid polymerization catalyst.

INTRODUCTION

Polyether alcohols are produced by reacting an initiator with an alkylene oxide in the presence of a catalyst, which can also be referred to as epoxide alcoholysis. The initiator has one or more functional groups the alkylene oxide can react with to begin forming polymer chains. The initiator may influence the molecular weight and establish the number of hydroxyl groups that the resultant polyether polyol will have. The use of a Lewis acid polymerization catalyst for such polymerization to form polyether alcohols has been proposed. Further, improvements of such Lewis acid polymerization catalyst are sought, e.g., to improve reaction selectivity, while still allowing for precise control of the polymerization reaction and optionally the production of non-finishing alcohols (i.e., alcohols that do not require further finishing).

SUMMARY

Embodiments may be realized by providing a method of producing a polyether alcohol that includes feeding an initiator into a reactor, the initiator having a nominal hydroxyl functionality of at least 1; feeding one or more monomers into the reactor, the one or more monomers being an alkylene oxide; feeding a polymerization catalyst into the reactor, the polymerization catalyst being a Lewis acid catalyst having a general formula $M(R^1)_1(R^2)_1(R^3)_1(R^4)_{0\ or\ 1}$, whereas M is boron, aluminum, indium, bismuth or erbium, $R^1$, $R^2$, $R^3$, and $R^4$ are each independent, $R^1$ includes a first fluoro/chloro or fluoroalkyl-substituted phenyl group, $R^2$ includes a second fluoro/chloro or fluoroalkyl-substituted phenyl group, $R^3$ includes a third fluoro/chloro or fluoroalkyl-substituted phenyl group or a first functional group or functional polymer group, optional $R^4$ is a second functional group or functional polymer group; separate from feeding the initiator into the reactor, feeding a hydrogen bond acceptor additive into the reactor, the hydrogen bond acceptor additive being a $C_2$ to $C_{20}$ organic molecule having at least two hydroxyl groups, of which two hydroxyl groups are situated in 1,2-, 1,3-, or 1,4-positions on the organic molecule; and allowing the initiator to react with the one or more monomers in the presence of the polymerization catalyst and the hydrogen bond acceptor additive to form a polyether alcohol having a number average molecular weight greater than a number average molecular weight of the initiator.

DETAILED DESCRIPTION

Epoxide alcoholysis is extensively employed in the synthesis of alcohols and it generally requires achieving high rates and selectivity. In a manufacturing process of producing the polyether alcohol, an initiator (that includes one or more initiator compounds having a nominal hydroxyl functionality of at least 1), one or more alkylene oxide monomers, and a polymerization catalyst may be fed into a reactor. A Lewis acid polymerization catalyst having a general formula $M(R^1)_1(R^2)_1(R^3)_1(R^4)_{0\ or\ 1}$, whereas M is boron, aluminum, indium, bismuth or erbium, $R_1$, $R^2$, $R^3$, and $R^4$ are each independent, $R^1$ includes a first fluoro/chloro or fluoroalkyl-substituted phenyl group, and $R^2$ includes a second fluoro/chloro or fluoroalkyl-substituted phenyl group, $R^3$ includes a third fluoro/chloro or fluoroalkyl-substituted phenyl group or a first functional group or functional polymer group, optional $R^4$ is a second functional group or functional polymer group, may be used to provide desired selectivity of the primary alcohol products during epoxide alcoholysis. Without intended to be bound by this theory, it is believed that during polymerization, in the presence of the Lewis acid polymerization catalyst, enthalpy barriers to undesired side-products may be increased. It is proposed that further improvements, e.g., in reaction selectivity with conversion, may be realized by the addition to the reactor of catalytic amounts of a hydrogen bond acceptor additive (also referred to herein as an HBA) which is a $C_2$ to $C_{20}$ organic molecule having at least two hydroxyl groups, of which two hydroxyl groups are situated in 1,2-, 1,3-, or 1,4-positions on the organic molecule. The hydrogen bond acceptor additive is added separately from the initiator, so as to be distinguished from the addition of the initiator, one or more monomers, and the polymerization catalyst. Further, the hydrogen bond acceptor is added in catalytic amounts, which is an amount that is substantially less than the amounts of the initiator and one or more monomers added.

Certain epoxides like styrene oxide or vinyl epoxides may be predisposed to ring opening to a single regioisomer due to strong stabilization of the carbocation intermediate or transition state. In contrast, the alcoholysis of aliphatic epoxides such as propylene oxide, 1-butene oxide, or 1-octene oxide may create a mixture of product regioisomers. Referring to the scheme below, for terminal aliphatic epoxides, the primary alcohol product (P1) is rarely favored over the secondary alcohol product (P2), e.g., due to steric hindrance from the alkyl tail and the absence of significant stabilization of the partial positive charge that forms during the transition state.

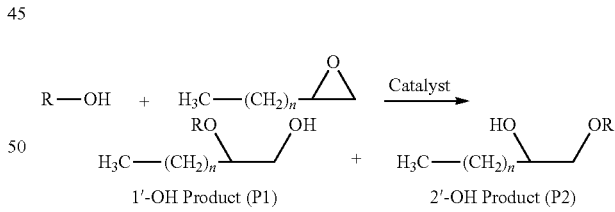

In applications such as epoxide oligomerization, terminal alcohols may be desired, but certain catalysts may be poorly selective for terminal aliphatic epoxides. For terminal aliphatic epoxides, NaOH or the industrial 'double metal cyanide' catalysts often give P1:P2 product ratios of less than 0.1:1 while many metal salts may give results similar to those of mineral acids like $H_2SO_4$, with P1:P2 product ratios of approximately 0.8:1. Some solid oxide catalysts have been reported to have P1:P2 selectivities up to 1.4:1. In contrast, Lewis acid catalysts according to exemplary embodiments such as tris(pentafluorophenyl)borane, also known as Fluorinated Aryl Borane (FAB), may have higher selectivities. Without intending to be bound by this theory, it is believed that FAB and analogous Lewis acid polymerization catalysts may operate by the route shown below with 1-octene oxide:

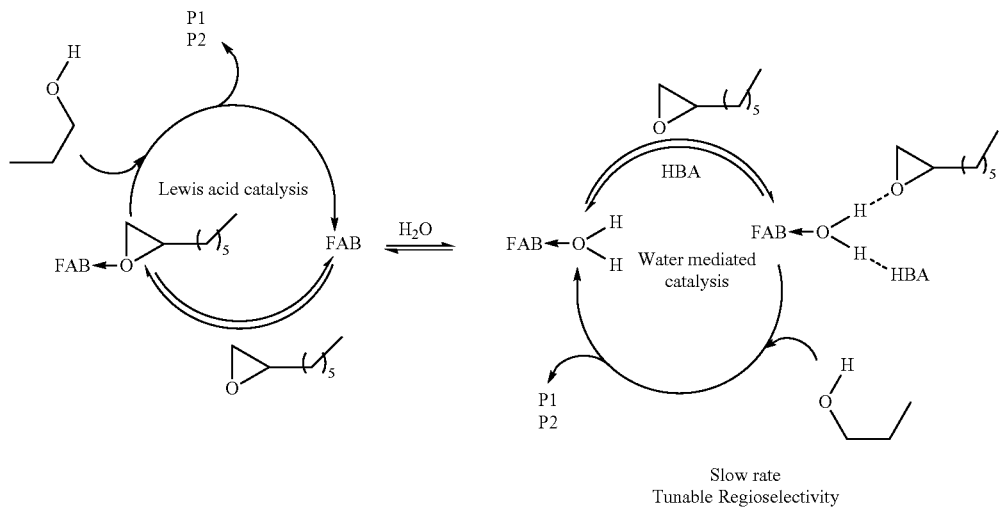

Referring to the above, in exemplary embodiments, without intending to be bound by this theory, it is believed that when an adduct such as FAB-H$_2$O (or analogous Lewis acid catalyst-H$_2$O adducts, for example where R$^1$, R$^2$, and R$^3$ have fluoro- or fluoroalkyl-substituted phenyl groups and R$_4$ is water) is the active catalyst species, several hydrogen-bonding adducts from the HBA (additive) can participate. For example, without intending to be bound by this theory, it is believed that the HBA may be part of a pentamolecular transition state and facilitate attack of the initiator onto the more hindered carbon of the epoxide and generate the primary hydroxyl product. In this transition state, one hydroxyl group of the HBA may be coordinated with catalyst.H$_2$O adduct and the other hydroxyl group guides the initiator, as shown below as an example of a transition state with a 1,2-diol as the HBA.

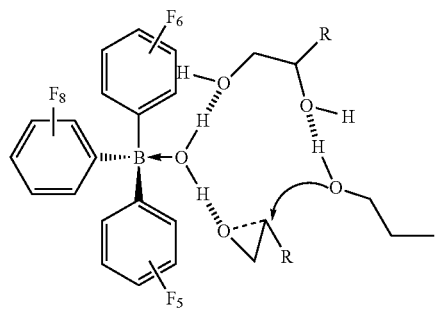

This transition state may indicate why the selectivity enhancements are observed with certain alcohols, but not with other molecules such as diethers. Because each of these intermediates has its own intrinsic activity and selectivity, the overall catalyst behavior may be sensitive to the reagent concentrations, residual water, temperature, and/or conversion. As discussed in this application, catalytic amounts of an additive (such as cis-1,2 and 1,3 diols) can significantly enhance the primary alcohol selectivity for the alcoholysis of terminal epoxides.

In exemplary embodiments, with use of the Lewis acid polymerization catalyst and the hydrogen bond acceptor additive, the selectivity for primary hydroxyl groups relative to secondary hydroxyl groups may be at least 3.8 (e.g., at least 3.9, at least 4.0, at least 4.1, at least 4.2, at least 4.3, up to 20.0, up to 19.0, up to 18.0, up to 10.0, up to 8.0, up to 7.0, up to 6.0, up to 5.0, etc.). Whereas, selectivity refers to final selectivity, which is the molar ratio of primary to secondary hydroxyl groups in a product at approximate 100% conversion determined using GC analysis.

The additive and the Lewis acid polymerization catalyst may be used to form a polyether alcohol (e.g., a propylene oxide-, ethylene oxide-, and/or butylene oxide-based monol or polyol) with a high yield of a desired product. The polyether alcohol may have a relatively high number average molecular weight (i.e., greater than 500 g/mol, greater than 1000 g/mol, greater than 2,500 g/mol such as from 2,600 g/mol to 12,000 g/mol, 3,000 g/mol to 6,000 g/mol, etc.) The polyether alcohol may have a specified primary hydroxyl group content (e.g., from 30% to 95%, based on a total number of hydroxyl groups), as determined by selectivity from primary hydroxyl groups versus secondary hydroxyl groups. Certain primary hydroxyl content values may be sought after for specific end-use applications of surfactants and further processing to form polyurethanes, based on a desired reactivity speed. For example, some end use applications may seek a rapid reactivity speed, for which a relatively higher primary hydroxyl group content may be sought. Other end-use applications may seek a relatively slow reactivity speed, for which a lower primary hydroxyl group content may be sought.

According to exemplary embodiments, a catalyst component for forming the polyether polyol may utilize the Lewis acid catalyst and optionally the DMC catalyst. For example, the Lewis acid catalyst may be used without the DMC catalyst, or the DMC catalyst and the Lewis acid catalyst may be used simultaneously or sequentially added. For example, in a DMC-Lewis acid dual catalyst system, a polymerization method may include initially adding a DMC catalyst and later adding the Lewis acid catalyst that is separately provided and allowed to react at a lower temperature than the temperature at which the DMC catalyst was added. The Lewis acid catalyst may be active at a lower temperature range (e.g., from 60° C. to 115° C.) than a temperature range at which the DMC catalyst may be active (e.g., from 125° C. to 160° C.).

Polyether alcohols include alcohols that have multiple ether bonds. Exemplary polyether alcohols include polyether hybrid polyols (such as polyether carbonate polyols and polyether ester polyols). The polyether alcohols are produced by polymerizing an alkylene oxide component that includes at least one alkylene oxide and an initiator that includes at least one initiator compound. The initiator has one or more functional groups at which the alkylene oxide can react to begin forming the polymer chains. The main functions of the initiator are to provide molecular weight control and to establish the number of hydroxyl groups that the monol or polyol product will have. The polyether carbonate may be producing by polymerizing carbon dioxide, at least one alkylene oxide, and an initiator. The polyether ester may be produced by polymerizing at least one alkylene oxide with a carboxylic acid initiator.

Additive (HBA) For Lewis Acid Polymerization Catalyst

The hydrogen bond acceptor additive (also referred to herein as an HBA) is a $C_2$ to $C_{20}$ (e.g., $C_2$ to $C_{15}$, $C_2$ to $C_{10}$, $C_2$ to $C_8$, $C_3$ to $C_{15}$, $C_3$ to $C_{10}$, $C_3$ to $C_8$, $C_4$ to $C_{15}$, $C_4$ to $C_{10}$, $C_4$ to $C_8$, etc.) organic molecule having at least two hydroxyl groups, of which two hydroxyl groups are situated at the 1,2-, 1,3-, or 1,4-positions on the organic molecule. Optionally additional hydroxyl groups may be situated at other positions on the organic molecule. Relative to the hydroxyl groups, the hydrogen bond acceptor additive may form cis isomers, trans isomers, or combinations thereof. The $C_2$ to $C_{20}$ organic molecule portion of the hydrogen bonding acceptor additive may be the organic backbone, e.g., may be a substituted or unsubstituted hydrocarbon. The organic backbone may be cyclic or acyclic. The hydrogen bonding acceptor additive may optionally be functionalized with halogens, ethers, cyano, carbonates, esters and/or imides.

By 1,2-positions it is meant one hydroxyl group substituent is attached to any carbon atom along the $C_2$ to $C_{20}$ organic molecule and the other hydroxyl group is attached to a carbon atom which attached to the carbon atom to which the first hydroxyl group is attached; for an aromatic compound, one hydroxyl group is attached in a position ortho to the other hydroxyl group. By 1,3-positions it is meant one hydroxyl group substituent is attached to any carbon atom along the $C_3$ to $C_{20}$ organic molecule and the other hydroxyl group is attached to a carbon atom which is attached a carbon atom which is attached to the carbon atom to which the first hydroxyl group is attached; for an aromatic compound, one hydroxyl group is attached in a position meta to the other hydroxyl group. By 1,4-positions it is mean one hydroxyl group substituent is attached to any carbon atom along the $C_4$ to $C_{20}$ organic molecule and the other hydroxyl group is attached to a carbon atom which is attached a carbon atom which is attached a carbon atom which is attached to the carbon atom to which the first hydroxyl group is attached; for an aromatic compound, one hydroxyl group is attached in a position para to the other hydroxyl group. By cis isomer it is meant one hydroxyl group substituent is situated on a same side of the $C_2$ to $C_{20}$ organic molecule as the other hydroxyl group, e.g., along a cyclic portion of the organic backbone. By trans isomer it is meant one hydroxyl group substituent is situated on a different side of the $C_2$ to $C_{20}$ organic molecule as the other hydroxyl group, e.g., along a cyclic portion of the organic backbone.

In exemplary embodiments, the hydrogen bond acceptor additive may be a cyclic $C_4$ to $C_{20}$ (e.g., $C_4$ to $C_{15}$, $C_4$ to $C_{10}$, $C_4$ to $C_8$, etc.) organic molecule is a cis isomer having two hydroxyl groups in the 1,2-position on the organic backbone. The hydrogen bond acceptor additive may be a linear or cyclic $C_3$ to $C_{20}$ (e.g., $C_3$ to $C_{15}$, $C_3$ to $C_{10}$, $C_3$ to $C_8$, etc.) organic molecule containing three hydroxyl groups in the 1,2,3-position on the organic backbone.

The hydrogen bond acceptor additive may be fed into the reactor in an amount greater than 0 and less than or equal to 0.25 (e.g., greater than 0.01, less than or equal to 0.05, etc.) molar equivalents per mole of the initiator feed into the reactor. The hydrogen bond acceptor additive may be fed into the reactor in an amount greater than 0 and less than or equal to 50 (e.g., greater than 1, greater than 5, less than 40, less than 30, less than 20, etc.) molar equivalents per mole of the polymerization catalyst feed into the reactor. The hydrogen bond acceptor additive is fed into the reactor separate from the feed of the initiator, so as to be distinguished, different, and separated from the initiator and the initiator feed into the reactor. For example, the initiator is fed into the reactor through a first line and the hydrogen bond acceptor is fed into the reactor through a second line that is separate and spaced apart from the first line. The second line may allow for less than 10% (less than 5%, less than 1%, etc.) of flow into the reactor relative to the first line, as the hydrogen bond acceptor is fed in substantially lower amounts relative to the initiator.

Lewis Acid Polymerization Catalyst

Use of a certain additive and Lewis acid catalysts as a polymerization catalyst is proposed (e.g., in a low amount such that filtration and acid finishing/neutralization are not required for the resultant polyether polyol), which may minimize side reactions, and may optionally be combined with a DMC catalyst. For example, it is proposed to use arylborane catalysts that have at least one fluoro/chloro or fluoroalkyl-substituted phenyl group, which may allow for improvements in the yield of the reaction. The polymerization catalyst may be fed into the reactor in an amount greater than 0 and less than or equal to 0.005 (e.g., greater than 0.0001, less than or equal to 0.003, less than or equal to 0.001, etc.) molar equivalents per mole of the initiator feed into the reactor. The Lewis acid catalyst may be active at a lower temperature range (e.g., from 60° C.-110° C.).

Without intended to be bound by this theory, it is believed that the such fluoro/chloro and fluoroalkyl groups, may impart unique properties to the metal (such as boron) active center. For example, the Hammett constant (σ) for a fluorine group in the para position ($\sigma_p$) is =0.06 whereas that for a $CF_3$ group in the para position is 0.54. As such, a $CF_3$ group may act as a unique electron-withdrawing group, which is in part related to the inability of its F atoms to donate electrons into the ring.

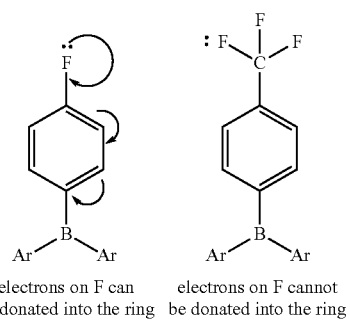

electrons on F can be donated into the ring    electrons on F cannot be donated into the ring The Lewis acid polymerization catalyst has the general formula $M(R^1)_1(R^2)_1(R^3)_1(R^4)_{0 \text{ or } 1}$, whereas M is boron, aluminum, indium, bismuth or erbium, $R^1$ includes (e.g., consists of) a first fluoro/chloro or fluoroalkyl-substituted phenyl group, $R^2$ includes (e.g., consists of) a second fluoro/chloro or fluoroalkyl-substituted phenyl group, $R^3$ includes (e.g., consists of) a third fluoro/chloro or fluoroalkyl-substituted phenyl group or a first functional group or functional polymer group, and optional $R^4$ is (e.g., consists of) a second functional group or functional polymer group. As used herewithin, by fluoro/chloro or fluoroalkyl-substituted phenyl group it is mean a fluoro/chloro substituted phenyl group or fluoroalkyl-substituted phenyl group, as described below, is present. By fluoroalkyl-substituted phenyl group it is meant a phenyl group that includes a least one hydrogen atom replaced with a fluoroalkyl group. By fluoro-substituted phenyl group it is meant a phenyl group that includes at least one hydrogen atom replaced with a fluorine atom. By chloro-substituted phenyl group it is meant a phenyl group that includes at least one hydrogen atom replaced with a chlorine atom. By fluoro/chloro substituted phenyl group it is meant a phenyl group that includes at least one hydrogen atom replaced with a fluorine or chlorine atom, whereas the containing two or more Lewis base functional groups such as polyols and polyethers based on polymers of ethylene oxide, propylene oxide, and butylene oxide. Exemplary polymeric Lewis bases include ethylene glycol, ethylene glycol methyl ether, ethylene glycol dimethyl ether, diethylene glycol, diethylene glycol dimethyl ether, triethylene glycol, triethylene glycol dimethyl ether, polyethylene glycol, polypropylene glycol, and polybutylene glycol.

Without intending to be bound by this theory, certain $R^4$ may help improve shelf life of the catalyst, e.g., without significantly compromising catalyst activity when utilized in a polymerization reaction. For example, the catalyst comprising M, $R_1$, $R^2$, and $R^3$ may be present in the form with the optional $R^4$ (form $M(R^1)_1(R^2)_1(R^3)_1(R^4)_1$) or without the optional $R^4$ (form $M(R^1)_1(R^2)_1(R^3)_1$). The optional $R^4$ may dissociate step-wise from $M(R^1)_1(R^2)_1(R^3)_1(R^4)_1$ to give free $M(R^1)_1(R^2)_1(R^3)_1$, as shown below for M=B, which free $M(R^1)_1(R^2)_1(R^3)_1$ may be a catalyst for an alkoxylation/polymerization process, and/or may dissociate from $M(R^1)_1(R^2)_1(R^3)_1(R^4)_1$ in a concerted or other single-step process with the alkylene oxide to give a catalyst for an alkoxylation/polymerization process.

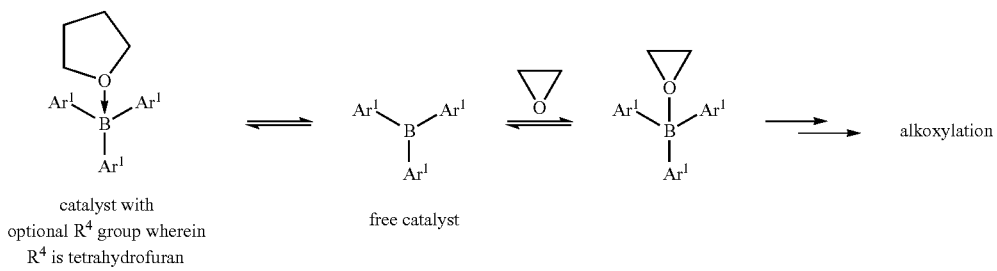

catalyst with
optional $R^4$ group wherein
$R^4$ is tetrahydrofuran free catalyst alkoxylation phenyl group can include a combination of fluorine and chlorine atom substituents. $R^1$, $R^2$, and $R^3$ may each independently include the fluoro/chloro or fluoroalkyl-substituted phenyl group or may each independently consist essentially of the fluoro/chloro or fluoroalkyl-substituted phenyl group. The M in the general formula may exist as a metal salt ion or as an integrally bonded part of the formula.

With respect to $R^3$ and optional $R^4$, the functional group or functional polymer group may be a Lewis base that forms a complex with the Lewis acid catalyst (e.g., a boron based Lewis acid catalyst) and/or a molecule or moiety that contains at least one electron pair that is available to form a dative bond with a Lewis acid. The Lewis base may be a polymeric Lewis base. By functional group or functional polymer group it is meant a molecule that contains at least one of the following: water, an alcohol, an alkoxy (examples include a linear or branched ether and a cyclic ether), a ketone, an ester, an organosiloxane, an amine, a phosphine, an oxime, and substituted analogs thereof. Each of the alcohol, linear or branched ether, cyclic ether, ketone, ester, alkoxy, organosiloxane, and oxime may include from 2-20 carbon atoms, from 2 2-12 carbon atoms, from 2-8 carbon atoms, and/or from 3-6 carbon atoms.

For example, the functional group or functional polymer group may have the formula (OYH)n, whereas O is O oxygen, H is hydrogen, Y is H or an alkyl group, and n is an integer (e.g., an integer from 1 to 100). However, other known functional polymer groups combinable with a Lewis acid catalyst such as a boron based Lewis acid catalyst may be used. Exemplary cyclic ethers include tetrahydrofuran and tetrahydropyran. Polymeric Lewis bases are moieties The ability of the optional $R^4$ group to protect the boron, aluminum, indium, bismuth and erbium center from inadvertent decomposition reactions may be related to a decrease in the accessible volume of the center. The accessible volume of the center is defined as the volume around the atom, such as the boron atom, that is available for interaction with other molecules.

| Catalyst | Accessible volume of boron (%) |
|---|---|
| | 25 |
| | 10 |

Suitable $R^4$ groups that can help increase catalyst shelf stability, e.g., without compromising catalyst activity, include diethyl ether, cyclopentyl methyl ether, methyl tertiary-butyl ether, tetrahydrofuran, 2-methyltetrahydrofuran, tetrahydropyran, 1,4-dioxane, acetone, methyl isopropyl ketone, isopropyl acetate, and isobutyl acetate.

According to exemplary embodiments, the Lewis acid catalyst is a boron based Lewis acid catalyst that has the general formula $B(R^1)_1(R^2)_1(R^3)_1(R^4)_{0\ or\ 1}$, whereas $R_1$, $R^2$, and $R^3$ are each independently a fluoro-substituted phenyl group, and optional $R^4$ is the functional group or functional polymer group.

In exemplary embodiments, the boron-based Lewis acid is tris(pentafluorophenyl)borane or isopropoxy-bis(pentafluorophenyl)borane wherein $^iPrO$ is isopropoxy.

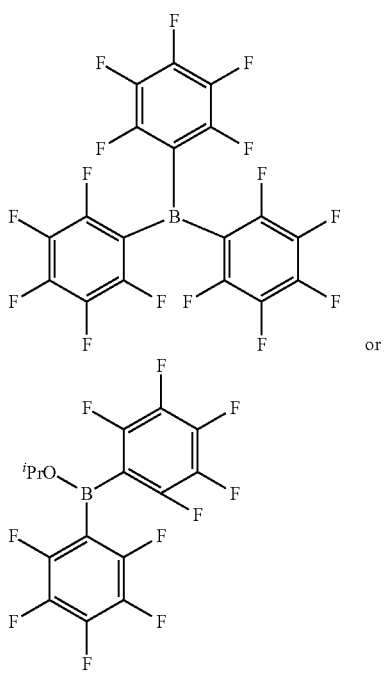

According to exemplary embodiments, the Lewis acid catalyst has the general formula $M(R^1)_1(R^2)_1(R^3)_1(R^4)_{0\ or\ 1}$, whereas M is boron, aluminum, indium, bismuth, or erbium, $R^1$, $R^2$, and $R^3$ are each a fluoroalkyl-substituted phenyl group, and optional $R^4$ is the functional group or functional polymer group discussed above. The M in the general formula may exist as a metal salt ion or as an integrally bonded part of the formula. $R^1$, $R^2$, and $R^3$ may each be an independent fluoroalkyl-substituted phenyl group. For example, $R^1$, $R^2$, and $R^3$ may each be the same fluoroalkyl-substituted phenyl group. $R^1$, $R^2$, and $R^3$ may include the fluoroalkyl-substituted phenyl group or may consist essentially of the fluoroalkyl-substituted phenyl group. Similarly, $R^4$ may include the functional group or functional polymer group, or consist essentially of the $R^4$ is the functional group or functional polymer group. With respect to $R^1$, $R^2$, and $R^3$, by fluoroalkyl-substituted phenyl group it is meant a phenyl group that includes at least one hydrogen atom replaced with a fluoroalkyl group, which is an alkyl group with at least one hydrogen atom replaced with a fluorine atom. For example, the fluoroalkyl group may have the structure $C_nH_mF_{2n+1-m}$, whereas n is greater than or equal to 1 and less than or equal to 5. Also, m is a number that reflects a balance of the electrical charges to provide an overall electrostatically neutral compound, e.g., can be zero, one or greater than one.

The phenyl group of the fluoroalkyl-substituted phenyl may be substituted to include other groups in addition to the at least one fluoroalkyl group, e.g., a fluorine atom and/or chlorine atom that replaces at least one hydrogen of the phenyl group. For example, $R^1$, $R^2$, and $R^3$ may be a fluoro/chloro-fluoroalkyl-substituted phenyl group (meaning one fluoro or chloro group and at least one fluoroalkyl group are substituted on the phenyl group), difluoro/chloro-fluoroalkyl-substituted phenyl group (meaning two fluoro, two chloro, or a fluoro and chloro groups and at least one fluoroalkyl group are substituted on the phenyl group), trifluoro/chloro-fluoroalkyl-substituted phenyl group (meaning three fluoro, three chloro, or a combination of fluoro and chloro groups totaling three and at least one fluoroalkyl group are substituted on the phenyl group), or tetrafluoro/chloro-fluoroalkyl-substituted phenyl group (meaning four fluoro, four chloro, or a combination of fluoro and chloro groups totaling four and one fluoroalkyl group are substituted on the phenyl group).

The functional group or functional polymer group $R^4$, if present, may be as a Lewis base that forms a complex with the Lewis acid catalyst (e.g., a boron-based Lewis acid catalyst) and/or a molecule or moiety that contains at least one electron pair that is available to form a dative bond with a Lewis acid, as discussed above.

In these exemplary embodiments, the Lewis acid catalysts have the following structure in which each of $Ar^1$ includes at least one fluoroalkyl (Y) group substituted on a phenyl group and optionally at least one fluoro or chloro (X) substituted on the phenyl group:

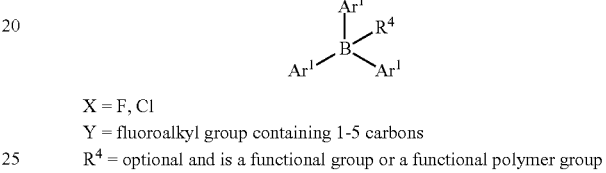

X = F, Cl
Y = fluoroalkyl group containing 1-5 carbons
$R^4$ = optional and is a functional group or a functional polymer group

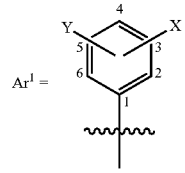

Y can be attached to positions 3, 4, 5 or a combination of these
X can be attached to positions 2, 3, 4, 5 or 6 or a combination of these Whereas each $Ar^1$ has the same structure. Exemplary structures for $Ar^1$ are the following, referred to as Set 1 structures:

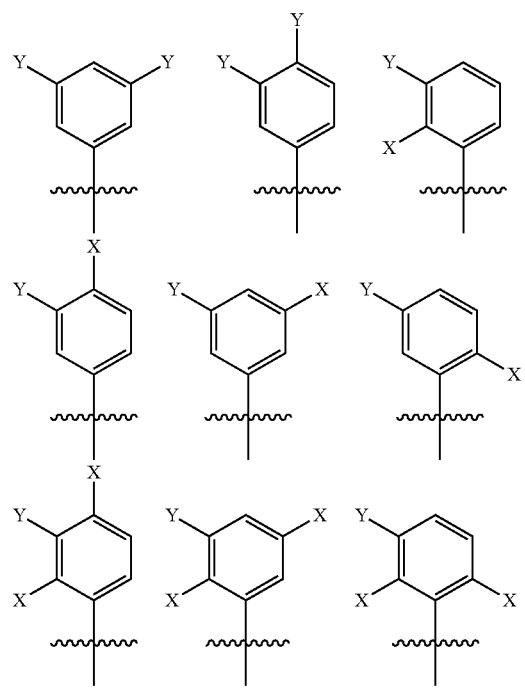

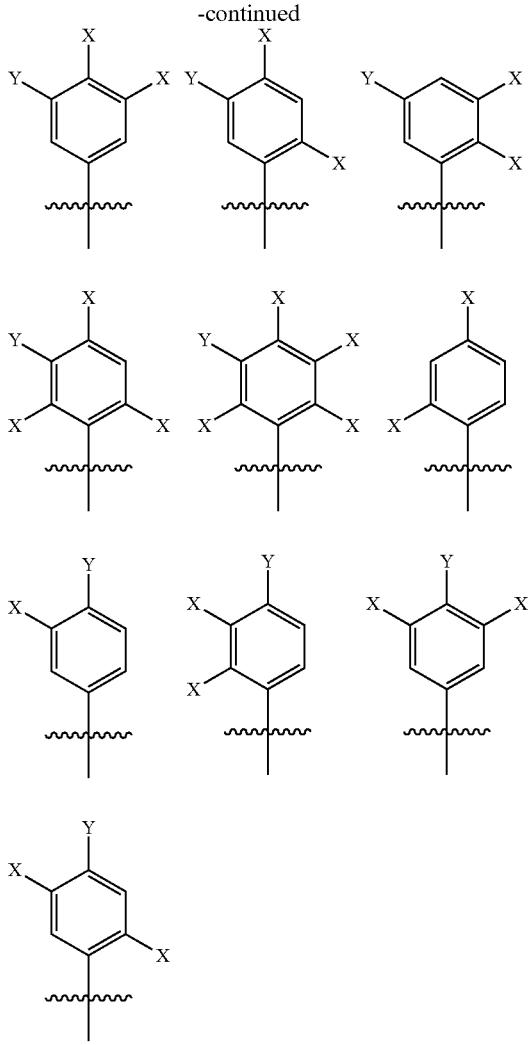

Exemplary structures for the Lewis acid catalysts, where M is Boron are shown below:

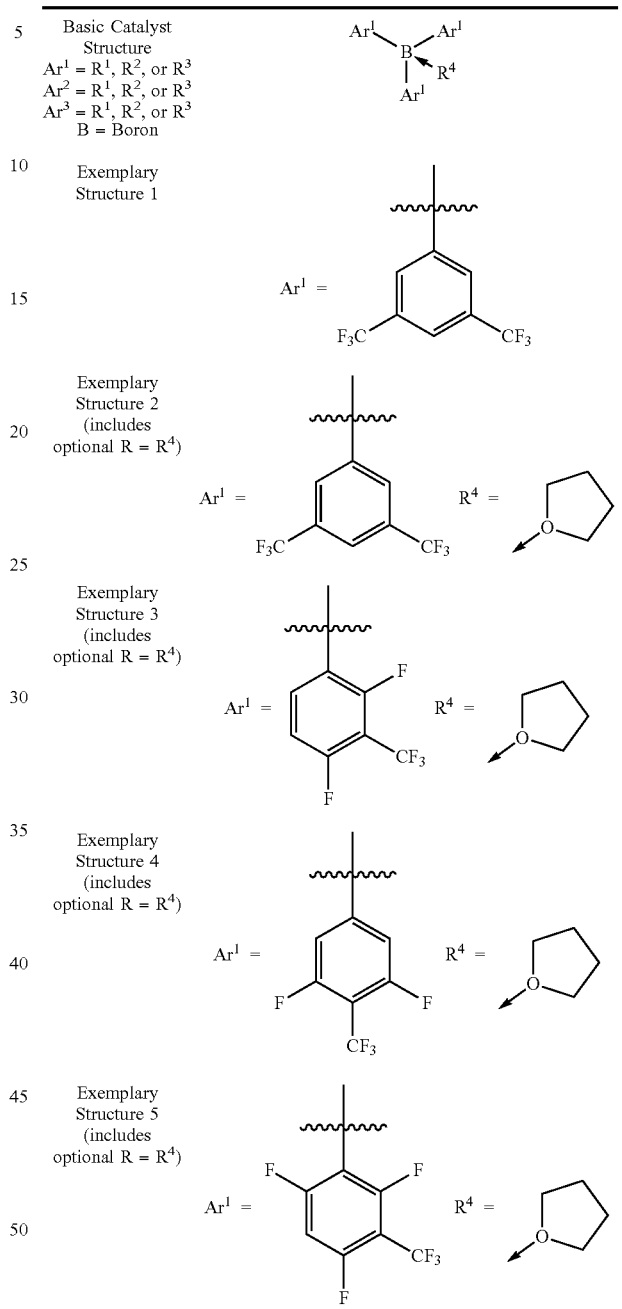

While the above illustrates exemplary structures that include boron, similar structures may be used that include other metals such as aluminum, indium, bismuth, and/or erbium.

According to these exemplary embodiments, the Lewis acid catalyst is a boron based Lewis acid catalyst that has the general formula $B(R^1)_1(R^2)_1(R^3)_1(R^4)_{0 \text{ or } 1}$, whereas $R^1$, $R^2$, and $R^3$ are a fluoroalkyl-substituted phenyl group, and optionally $R^4$ is the functional group or functional polymer group. For example, the fluoroalkyl-substituted phenyl group is a 2,4-difluoro-3-(trifluoromethyl)phenyl group. For example, the fluoroalkyl-substituted phenyl group is a 2,4,6-trifluoro-3-(trifluoromethyl)phenyl group. In exemplary embodiments, at least one of $R^1$ or $R^2$ or $R^3$ is a 3,4- or 3,5-bis(fluoroalkyl)-substituted phenyl group (e.g., a 3,4- or 3,5-bis(trifluoromethyl)-substituted phenyl group). For example, $R^4$ is a cyclic ether having 3-10 carbon atoms. In another example, each of $R_1$, $R_2$, and $R_3$ is a fluoro/chlorofluoroalkyl-substituted phenyl group, difluoro/chloro-fluoroalkyl-substituted phenyl group, trifluoro/chloro-fluoroalkyl-substituted phenyl group, or tetrafluoro/chloro-fluoroalkyl-substituted phenyl group.

According to other exemplary embodiments, the Lewis acid catalyst has the general formula $M(R^1)_1(R^2)_1(R^3)_1(R^4)_{0 \text{ or } 1}$, whereas M is boron, aluminum, indium, bismuth or erbium, $R_1$ includes a first fluoroalkyl-substituted phenyl group, $R^2$ includes a second fluoroalkyl-substituted phenyl group or a first fluoro-substituted phenyl group or a chloro-substituted phenyl group (i.e., a fluoro/chloro or fluoroalkyl-substituted substituted phenyl group), $R^3$ includes a third fluoroalkyl-substituted phenyl group or a second fluoro-substituted phenyl group or a chloro-substituted phenyl group (i.e., a fluoro/chloro or fluoroalkyl-substituted substituted phenyl group), and optional $R^4$ is the functional group or functional polymer group. The M in the general formula may exist as a metal salt ion or as an integrally bonded part of the formula. $R_1$, $R^2$, $R^3$ and $R^4$ are each independent of each other, e.g., a fluoroalkyl-substituted phenyl group of $R^1$ may be the same as or different from a fluoroalkyl-substituted phenyl group of $R^2$. Though, $R_1$ is different from at least one of $R^2$ and $R^3$, such that each of $R_1$, $R^2$, and $R^3$ are not all the same (e.g., same fluoroalkyl-substituted phenyl group), but $R^1$ may or may not be the same as $R^2$ or $R^3$.

$R_1$ may include the first fluoroalkyl-substituted phenyl group or may consist essentially of the first fluoroalkyl-substituted phenyl group. Similarly, $R^2$ may include the second fluoroalkyl-substituted phenyl group or the first fluoro/chloro-substituted phenyl group, or consist essentially of the second fluoroalkyl-substituted phenyl group or the first fluoro/chloro-substituted phenyl group. Similarly, $R^3$ may include the third fluoroalkyl-substituted phenyl group or the second fluoro/chloro-substituted phenyl group, or consist essentially of the third fluoroalkyl-substituted phenyl group or the second fluoro/chloro-substituted phenyl group. Similarly, $R^4$ may include the functional group or functional polymer group, or consist essentially of the $R^4$ is the functional group or functional polymer group.

With respect to $R_1$, $R^2$, and $R^3$, by fluoroalkyl-substituted phenyl group it is meant a phenyl group that includes at least one hydrogen atom replaced with a fluoroalkyl group, which is an alkyl group with at least one hydrogen atom replaced with a fluorine atom. For example, the fluoroalkyl group may have the structure $C_nH_mF_{2n+1-m}$, whereas n is greater than or equal to 1 and less than or equal to 5. Also, m is a number that reflects a balance of the electrical charges to provide an overall electrostatically neutral compound, e.g., can be zero, one or greater than one. The phenyl group of the fluoroalkyl-substituted phenyl may be substituted to include other groups in addition to the at least one fluoroalkyl group, e.g., a fluorine atom and/or chlorine atom that replaces at least one hydrogen of the phenyl group. For example, $R_1$, $R^2$, or $R^3$ may be a fluoro/chloro-fluoroalkyl-substituted phenyl group (meaning one fluoro or chloro group and at least one fluoroalkyl group are substituted on the phenyl group), difluoro/chloro-fluoroalkyl-substituted phenyl group (meaning two fluoro, two chloro, or a fluoro and chloro group and at least one fluoroalkyl group are substituted on the phenyl group), trifluoro/chloro-fluoroalkyl-substituted phenyl group (meaning three fluoro, three chloro, or a combination of fluoro and chloro groups totaling three and at least one fluoroalkyl group are substituted on the phenyl group), or tetrafluoro/chloro-fluoroalkyl-substituted phenyl group (meaning four fluoro, four chloro, or a combination of fluoro and chloro groups totaling four and one fluoroalkyl group are substituted on the phenyl group).

With respect to $R^2$ and $R^3$, by fluoro-substituted phenyl group it is meant a phenyl group that includes at least one hydrogen atom replaced with a fluorine atom. By chloro-substituted phenyl group it is meant a phenyl group that includes at least one hydrogen atom replaced with a chlorine atom. The phenyl group of the fluoro/chloro-substituted phenyl group may be substituted with other groups (such as may include a combination of fluoro, chloro, and/or hydrogens), but excludes any fluoroalkyl groups (e.g., excludes the group having the structure $C_nH_mF_{2n+1-m}$ discussed above). Accordingly, the fluoro/chloro-substituted phenyl group is differentiated from the fluoroalkyl-substituted phenyl group, by the exclusion of any fluoroalkyl groups substituted on the phenyl ring.

With respect to optional $R^4$, the functional group or functional polymer group may be a Lewis base that forms a complex with the Lewis acid catalyst (e.g., a boron-based Lewis acid catalyst) and/or a molecule or moiety that contains at least one electron pair that is available to form a dative bond with a Lewis acid, as discussed above.

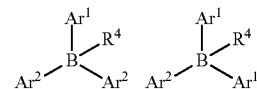

X = F, Cl
Y = fluoroalkyl group containing 1-5 carbons
$R^4$ = optional and is a functional group or a functional polymer group

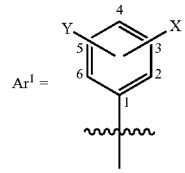

Y can be attached to positions 3, 4, 5 or a combination of these
X can be attached to positions 2, 3, 4, 5 or 6 or a combination of these

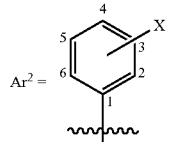

X can be attached to positions 2, 3, 4, 5 or 6 or a combination of these

Whereas for exemplary structures, $Ar^1$ is chosen from the following, referred to as the Set 1 structures:

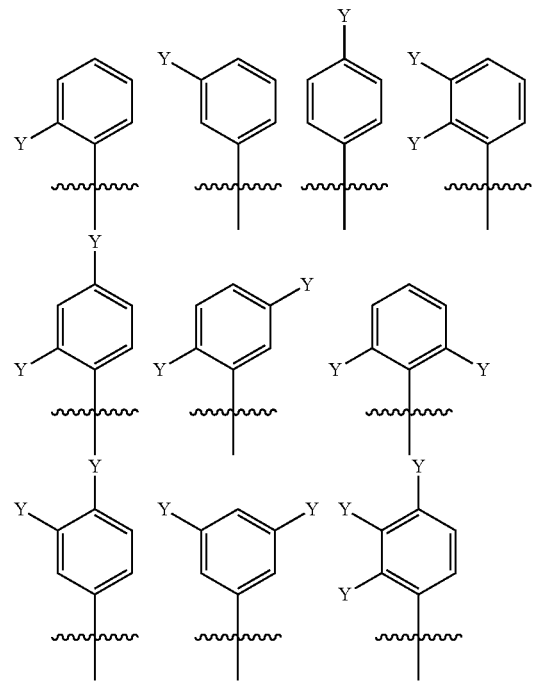

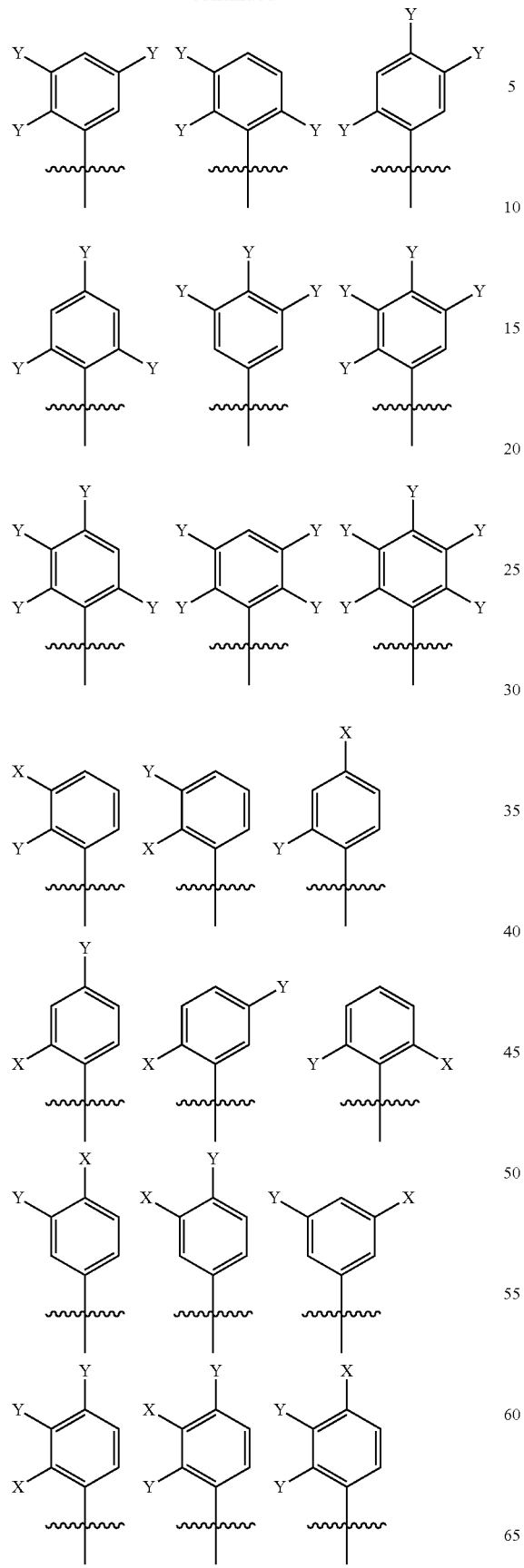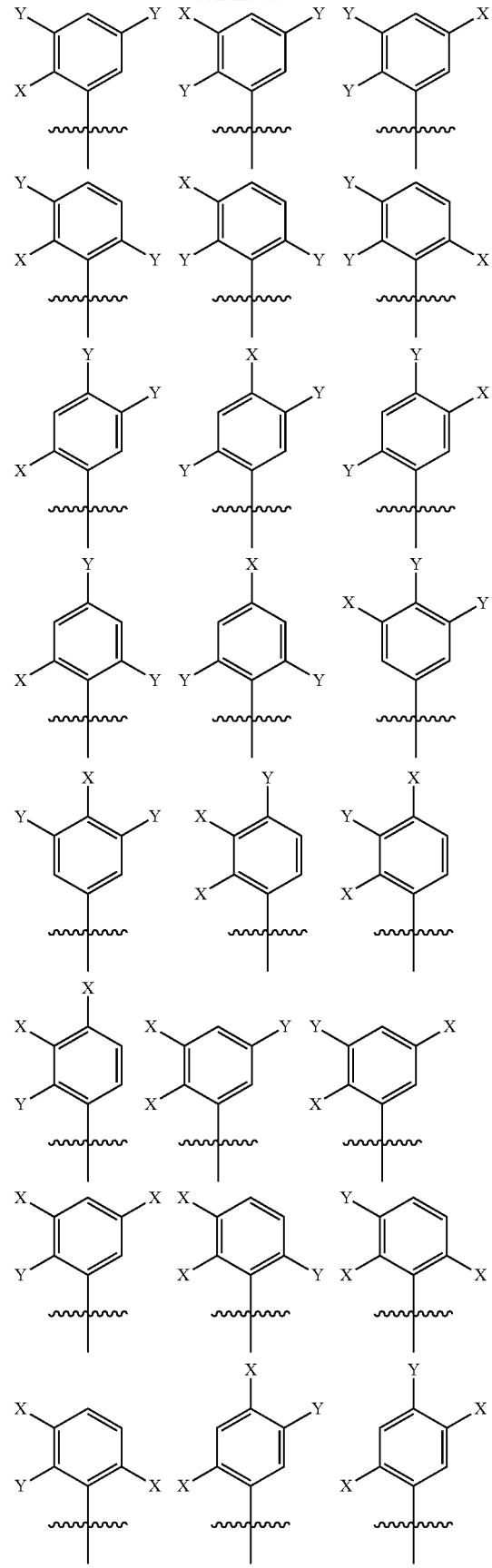

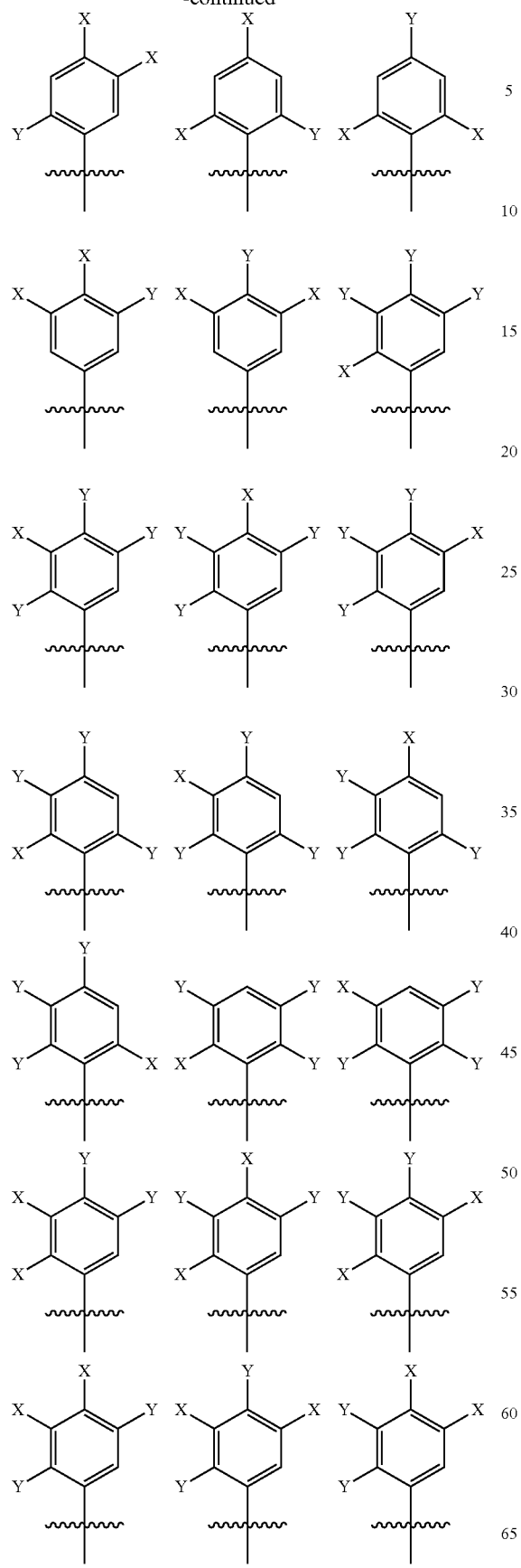
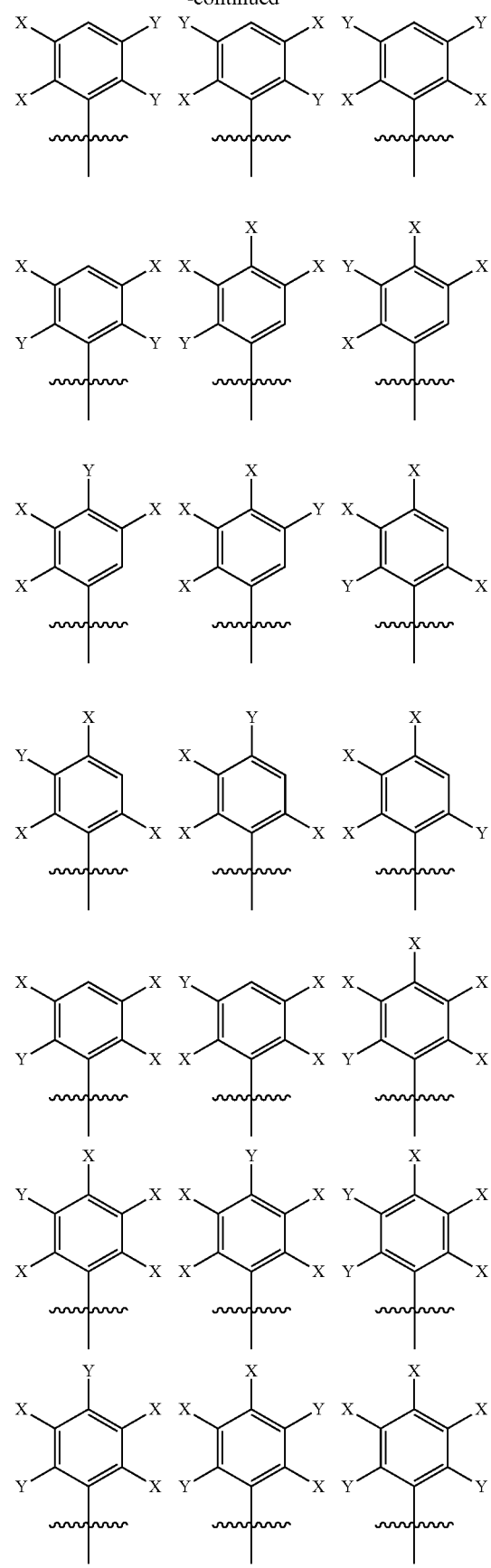

-continued

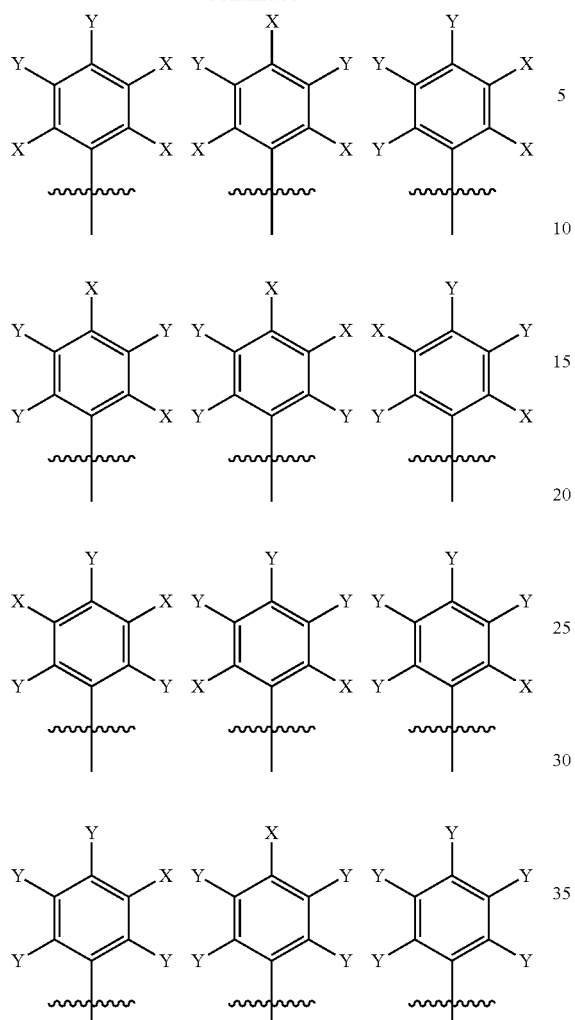

Whereas for exemplary structures, Ar² is chosen from the following, referred to as Set 2 structures:

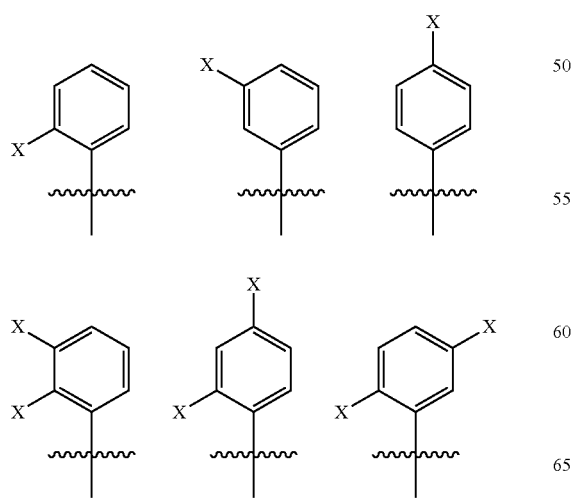

-continued

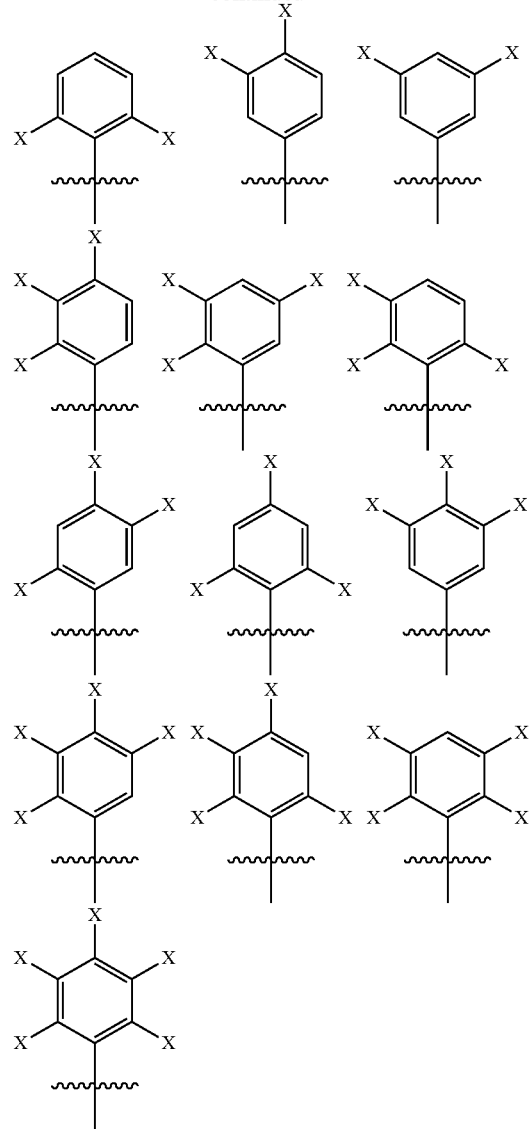

Further, the Lewis acid catalysts may have the following structures:

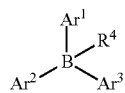

X = F, Cl
Y = fluoroalkyl group containing 1-5 carbons
R⁴ = optional and is a functional group or a functional polymer group Ar¹, Ar², Ar³ = 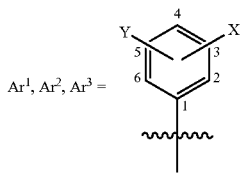

Y can be attached to positions 2, 3, 4, 5 or 6 or a combination of these
X can be attached to positions 2, 3, 4, 5 or 6 or a combination of these According to exemplary embodiments, the Lewis acid catalyst is a boron based Lewis acid catalyst that has the general formula $B(R^1)_1(R^2)_1(R^3)_1(R^4)_{0 \text{ or } 1}$, whereas $R_1$ is the first fluoroalkyl-substituted phenyl group (e.g., any structure from Set 1 structures), $R^2$ is the second fluoroalkyl-substituted phenyl group (e.g., any structure from Set 1 structures) or the first fluoro/chloro-substituted phenyl group (e.g., any structure from Set 2 structures), $R^3$ is the third fluoroalkyl-substituted phenyl group (e.g., any structure from Set 1 structures) or the second fluoro/chloro-substituted phenyl group (e.g., any structure from Set 2 structures), and optional $R^4$ is the functional group or functional polymer group, as discussed above. In exemplary embodiments, at least one of $R_1$ or $R^2$ or $R^3$ is a 3,4- or 3,5-bis (fluoroalkyl)-substituted phenyl group (e.g., a 3,4 or 3,5-bis (trifluoromethyl)-substituted phenyl group). For example, $R^4$ is a cyclic ether having 3-10 carbon atoms.

Exemplary structures for the Lewis acid catalysts, where M is Boron are shown below:

Basic Catalyst Structure
$Ar^1 = R^1, R^2, \text{ or } R^3$
$Ar^2 = R^1, R^2, \text{ or } R^3$
$Ar^3 = R^1, R^2, \text{ or } R^3$
B = Boron
Any of the structures may include optional $R = R^4$ Exemplary Structure 1

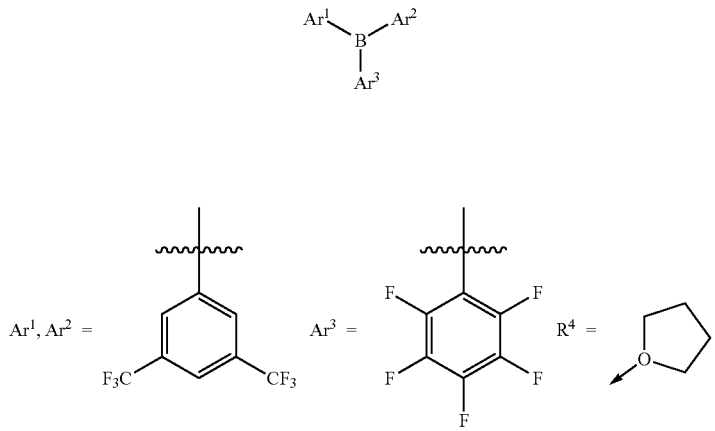

Exemplary Structure 2

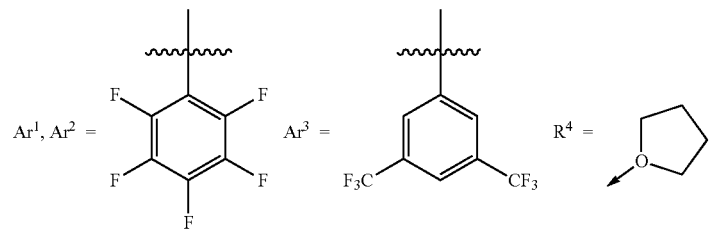

Exemplary Structure 3

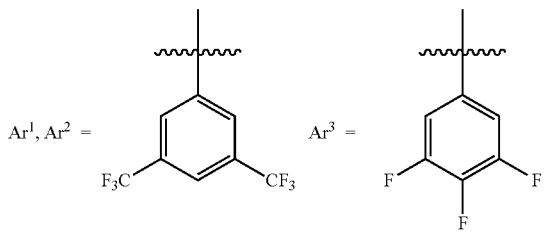 [SMILES: *c1cc(C(F)(F)F)cc(C(F)(F)F)c1 ; *c1cc(F)c(F)c(F)c1]

Exemplary Structure 4

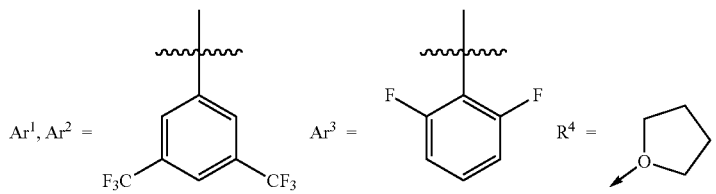

Exemplary Structure 5

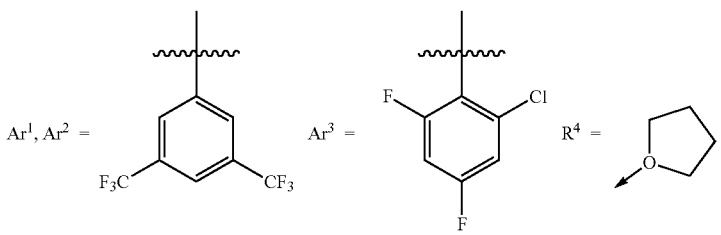

-continued
Exemplary Structure 6
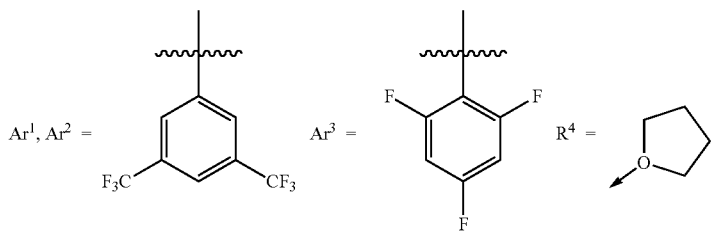
Exemplary Structure 7
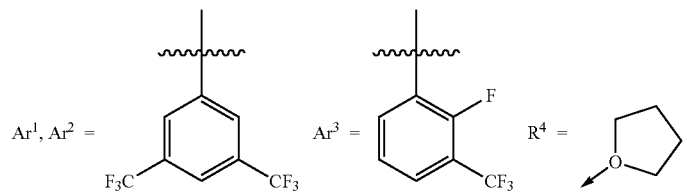
Exemplary Structure 8
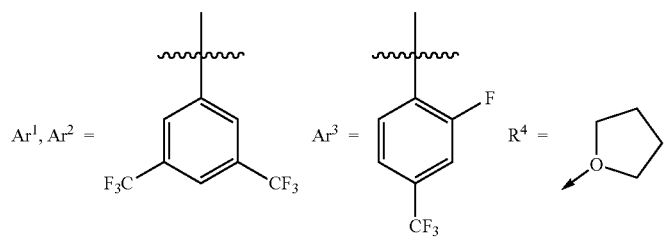
Exemplary Structure 9
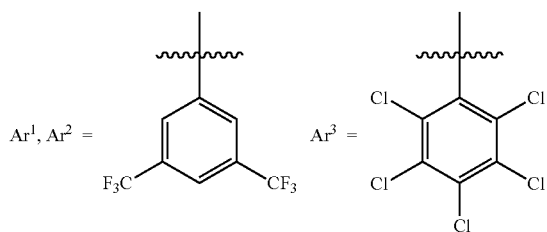 [SMILES: *c1cc(C(F)(F)F)cc(C(F)(F)F)c1 ; *c1c(Cl)c(Cl)c(Cl)c(Cl)c1Cl]
Exemplary Structure 10
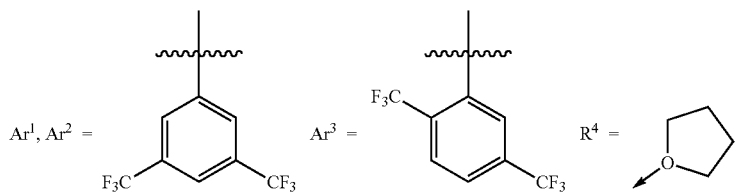
Exemplary Structure 11
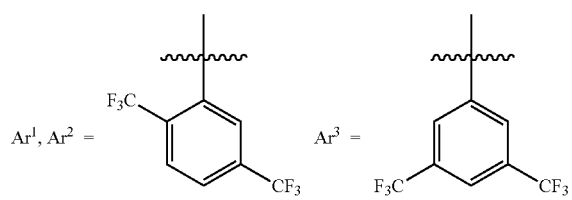 [SMILES: *c1cc(C(F)(F)F)ccc1C(F)(F)F ; *c1cc(C(F)(F)F)cc(C(F)(F)F)c1]
Exemplary Structure 12
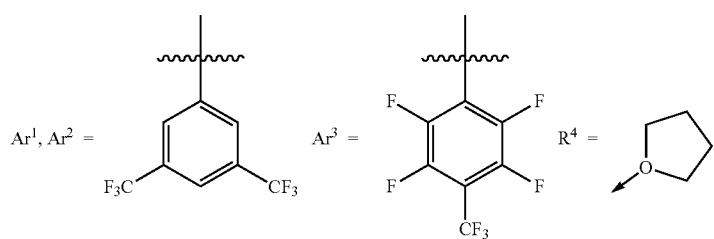

| Exemplary Structure 13 | 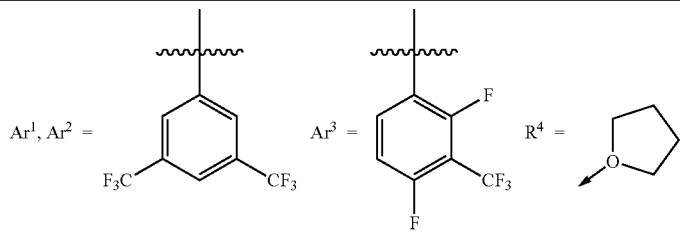 |
|---|---|

While the above illustrates exemplary structures that include boron, similar structures may be used in which boron is replaced by metals such as aluminum, indium, bismuth, and/or erbium. Further, exemplary embodiments may utilize a blend or mixture of catalysts, e.g., using one or more of the catalyst structures above.

For example, referring to the other exemplary embodiments, the Lewis acid catalyst has the following structure that includes at least one 3,5-bis(trifluoromethyl)-substituted phenyl group (in this instance a 3,5-bis(trifluoromethyl)-substituted phenyl group) and at least one substituted phenyl group (i.e., Ar) independently selected from the structures shown below:

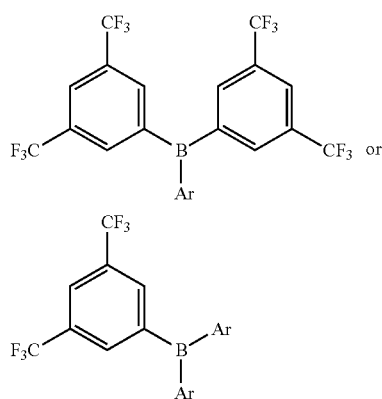

Ar selected from

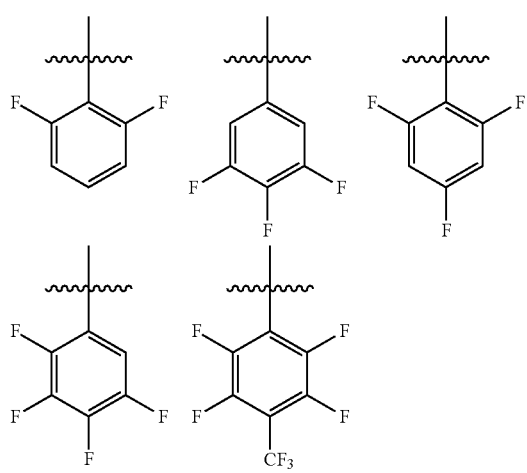

The M in the general formula may exist as a metal salt ion or as an integrally bonded part of the formula. $R_1$, $R^2$, $R^3$, and $R^4$ are each independent of each other, e.g., a Set 1 structure of $R^2$ may be the same as or different from a Set 1 structure of $R^3$.

As discussed above, with respect to optional $R^4$, above, the functional group or functional polymer group may be a Lewis base that forms a complex with the Lewis acid catalyst (e.g., a boron based Lewis acid catalyst) and/or a molecule or moiety that contains at least one electron pair that is available to form a dative bond with a Lewis acid.

With respect to the above, exemplary embodiments may utilize a blend of catalyst, e.g., using one or more of the catalysts structures above. The Lewis acid catalyst used in exemplary embodiments may be a blend catalyst that includes one or more Lewis acid catalysts (e.g., each having the general formula $B(R^1)_1(R^2)_1(R^3)_1(R^4)_{0 \text{ or } 1}$) and optionally at least one other catalyst (e.g., such as catalysts known in the art for producing polyether polyols). The blend catalyst may optionally include other catalysts, in which the one or more Lewis acid catalysts having the general formula $B(R^1)_1(R^2)_1(R^3)_1(R^4)_{0 \text{ or } 1}$ account for at least 25 wt %, at least 50 wt %, at least 70 wt %, at least 75 wt %, at least 80 wt %, at least 85 wt %, at least 90 wt %, at least 95 wt %, at least 99 wt %, etc., of the total weight of the blend catalyst. The added blend catalyst may include or exclude any DMC based catalysts. Exemplary other metal based Lewis acids that are active at lower temperatures may be included as part of the dual catalyst system and/or the blend catalyst. Exemplary metal-based Lewis acids are based on one of aluminum, boron, copper, iron, silicon, tin, titanium, zinc, and zirconium.

DMC Catalyst

The catalyst component may optionally include DMC catalysts. Exemplary DMC catalysts and method of producing DMC catalyst are described, e.g., in U.S. Pat. Nos. 3,278,457, 3,278,458, 3,278,459, 3,404,109, 3,427,256, 3,427,334, 3,427,335, and 5,470,813. An exemplary type of DMC catalyst is a zinc hexacyanocobaltate catalyst complex. The mDMC catalyst complexes may be prepared using modified methods of forming the DMC catalysts. The DMC catalyst, e.g., ones that are known in the art, may be used in the catalyst system that includes the Lewis acid catalyst. The DMC catalyst may be the first or second catalyst that is provided.

For example, the DMC catalysts may be represented by the Formula 1:

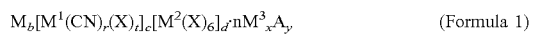

$$M_b[M^1(CN)_r(X)_t]_c[M^2(X)_6]_d \cdot nM^3{}_xA_y \quad \text{(Formula 1)}$$

wherein M and $M^3$ are each metals; $M^1$ is a transition metal different from M. $X^1$ represents a group other than cyanide that coordinates with the $M^1$ ion. $M^2$ is a transition metal. $X^2$ represents a group other than cyanide that coordinates with the $M^2$ ion. $X^1$ or $X^2$ may each independently be a halogen, sulfate, nitrate, phosphate, carbonate, or chlorate. In exemplary embodiments, $X^1$ and $X^2$ are the same and are chloride. $A^l$ represents an anion; b, c and d are numbers that reflect an electrostatically neutral complex; r is from 4 to 6; t is from 0 to 2; x and y are integers that balance the charges in the metal salt $M^3{}_xA_y$, and n is zero or a positive integer. For example, n is from 0.01 to 20. The foregoing formula does not reflect the presence of neutral complexing agents such as t-butanol which are often present in the DMC catalyst complex.

Referring to Formula (I), M and $M^3$ each are a metal ion independently selected from (e.g., from the group consisting of): $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$. Exemplary embodiments include at least $Zn^{2+}$. Further, $M^1$ and $M^2$ each are a metal ion independently selected from (e.g., from the group consisting of): $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state may be used for the $M^1$ and $M^2$ metal. Exemplary embodiments include $Co^{3+}$ and/or $Fe^{3+}$.

Suitable anions A include, but are not limited to, halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. Exemplary embodiments include the chloride ion.

Referring to Formula (I), r is an integer that is 4, 5 or 6. In exemplary embodiments, r is 4 or 6. Further, t is an integer from 0 to 2, and in exemplary embodiments t is 0. The sum of r+t may equal six.

In exemplary embodiments, the DMC catalyst is a zinc hexacyanocobaltate catalyst complex. The DMC catalyst may be complexed with t-butanol. The DMC catalyst used in exemplary embodiments may be a blend catalyst that includes of one or more DMC catalysts. The blend catalyst may optionally include a non-DMC catalyst, in which the DMC catalysts account for at least 75 wt % of the total weight of the blend catalyst. The blend catalyst may exclude any of Lewis acid catalyst that is added at a later time in the dual catalyst system.

Monomers

The one or monomers used to prepare the polyether alcohol are alkylene oxides. For example, the alkylene oxide may have from 2 to 25 carbon atoms, one epoxy group, and one carbon-carbon double bond. Exemplary monomers include ethylene oxide, propylene oxide (1,2-propene oxide), butylene oxide (1,2-butene oxide), pentylene oxide (also known as 1,2-epoxypentane), hexylene oxide (also known as 1,2-epoxyhexane), octylene oxide (also known as 1,2-epoxyoctane), nonylene oxide (also known as 1,2-epoxynonane), decylene oxide (also known as 1,2-epoxydecane), isobutylene oxide, 4-methyl-1-pentylene oxide, and styrene oxide. Exemplary monomers include alkylene oxide monomers having at least three carbon atoms that are selected from 1,2-alkene oxide monomers having from three to ten carbon atoms (linear or branched) and/or arylalkylene oxide monomers.

Use of the Additive and Catalyst Component

In embodiments where the one or more Lewis acid catalysts are used in the alkoxylation process of low hydroxyl equivalent weight starter compounds, also referred to as the initiator, the process may proceed directly from the initiator to a finished polyether alcohol by the polymerization of one or more alkylene oxides. Further, the use of the Lewis acid catalyst with the hydrogen bond acceptor (HBA) additive may allow for improved selectivity of primary hydroxyl groups relative to secondary hydroxyl groups.

The initiator includes one or more compounds having a low molecular weight and a nominal hydroxyl functionality of at least 1 (e.g., of 1 when forming monols and at least 2 when forming polyols). The initiator is any organic compound that is to be alkoxylated in the polymerization reaction. The initiator may contain as many as 12 or more hydroxyl groups. For example, the initiator may be a diol, triol, or hexol. Mixtures of starter compounds/initiators may be used. The initiator will have a hydroxyl equivalent weight less than that of the polyether product, e.g., may have a hydroxyl equivalent weight of less than 3500 g/mol equivalence, less than 333 g/mol equivalence, less than 300 g/mol equivalence, greater than 30 g/mol equivalence, from 30 to 300 g/mol equivalence, from 30 to 250 g/mol equivalence, from 50 to 250 g/mol equivalence, etc. Exemplary, initiator compounds include, but are not limited to, ethylene glycol, diethylene glycol, triethylene glycol, propylene glycol, dipropylene glycol, tripropylene glycol, 1,4-butanediol, 1,6-hexanediol, 1,8-octanediol, cyclohexane dimethanol, glycerin, trimethylolpropane, trimethylolethane, pentaerythritol, sorbitol, sucrose, and/or alkoxylates (especially ethoxylates and/or propoxylates) any of these that have a number average molecular weight less than that of the product of the polymerization (e.g., less than 5000 g/mol, less than 4000 g/mol, less than 3000 g/mol, less than 2000 g/mol, and/or less than 1000 g/mol).

The initiator compound may be a low molecular weight polyether polyol that has been formed using an alkylene oxide such as propylene oxide, ethylene oxide, and/or butylene oxide (e.g., which is polymerized with another starter compound/initiator). The initiator compound may be a diol or triol. For example, the initiator compound is an all-propylene oxide-based diol or triol. The initiator compound may have a hydroxyl functional based equivalent weight of may have a hydroxyl equivalent weight of less than 3500 g/mol equivalence, less than 333 g/mol equivalence, less than 300 g/mol equivalence, greater than 30 g/mol equivalence, from 30 to 300 g/mol equivalence, from 30 to 250 g/mol equivalence, from 50 to 250 g/mol equivalence, etc.

When the Lewis acid catalyst is used, the temperature of the reactor may be reduced at least 20° C. as compared to when the DMC catalyst is used. For example, the temperature for use of a DMC catalyst may be from 125° C. to 160° C. (e.g., during a time at which a propylene oxide feed is gradually/slowly added to the reactor and after the time at which the starter compound is mixed with the DMC catalyst). The temperature for use of the Lewis acid catalyst may be from 25° C. to 115° C. and/or from 60° C. to 115° C. In exemplary embodiments, the control of the relative contribution of a mixture containing an active DMC catalyst and an active Lewis acid may enable the Lewis acid to dominate the addition of oxirane onto chain ends.

In an exemplary embodiment, when the polyether alcohol is derived from propylene oxide based initiator (e.g., a polyoxypropylene starter compound), during the polymerization process propylene oxide, ethylene oxide, and/or butylene oxide may be added to the reaction mixture to form the polyether polyol having a number average molecular weight of greater than the number average molecular weight of the initiator.

The polymerization reaction can be performed in any type of vessel that is suitable for the pressures and temperatures encountered. In a continuous or semi-continuous process the vessel may have one or more inlets through which the alkylene oxide, additional initiator compound, catalyst, hydrogen bond acceptor additive, air or inert gas (purge or blanket gas such as nitrogen) and optional solvent may be introduced before or during the reaction. In a continuous process, the reactor vessel should contain at least one outlet through which a portion of the partially or fully polymerized reaction mixture may be withdrawn. A tubular reactor that has single or multiple points for injecting the starting materials, a loop reactor, and a continuous stirred tank reactor (CSTR) are all suitable types of vessels for continuous or semi-continuous operations. An exemplary process is discussed in U.S. Patent Publication No. 2011/0105802.

The resultant polyether alcohol product may be further treated, e.g., in a flashing process and/or stripping process. The polyether alcohol may be a finished or non-finished alcohol. For example, the polyether alcohol may include the Lewis acid catalyst, or the polyether alcohol may be treated to reduce catalyst residues even though some of the catalyst residue may be retained in the product. Moisture may be removed by stripping the polyol. The polyether alcohol derived from ethylene oxide, propylene oxide and/or butylene oxide according to embodiments may have a Lewis acid catalyst concentration (in ppm in the final polyol) of from 25 ppm to 1000 ppm (e.g., 50 ppm to 100 ppm, 100 ppm to 500 ppm and/or 100 ppm to 250 ppm).

The polymerization reaction may be characterized by the "build ratio", which is defined as the ratio of the number average molecular weight of the polyether product to that of the initiator compound. This build ratio may be as high as 160, but is more commonly in the range of from 2.5 to about 65 and still more commonly in the range of from 2.5 to about 50. The build ratio is typically in the range of from about 2.5 to about 15, or from about 7 to about 11 when the polyether product has a hydroxyl equivalent weight of from 85 to 400.

Polyether polyols produced in accordance with embodiments may be useful for making polyurethanes. The polyurethane polymers may be prepared as the reaction product of the polyether polyol and an isocyanate (such as a polyisocyanate, of which examples include methylenediphenyl diisocyanate also known as MDI and toluene diisocyanate also known as TDI). For example, higher equivalent weight polyether polyol products may be useful in making elastomeric or semi-elastomeric polyurethane products, including noncellular or microcellular elastomers, coatings, adhesives, sealants, composites, and flexible, rigid, and viscoelastic polyurethane foams. The polyurethane foams may be made in a slabstock or molding process.

All parts and percentages are by weight unless otherwise indicated. All molecular weight values are based on number average molecular weight unless otherwise indicated.

EXAMPLES

Approximate properties, characters, parameters, etc., are provided below with respect to various working examples, comparative examples, and the materials used in the working and comparative examples.

Referring to the Examples, the ring-opening of 1,2-epoxyoctane by 1-propanol using 0.1 mol % FAB (with respect to the molar amount of 1,2-epoxyoctane) as the catalyst is studied for products P1 (containing primary alcohol) and P2 (containing secondary alcohol), as follows:

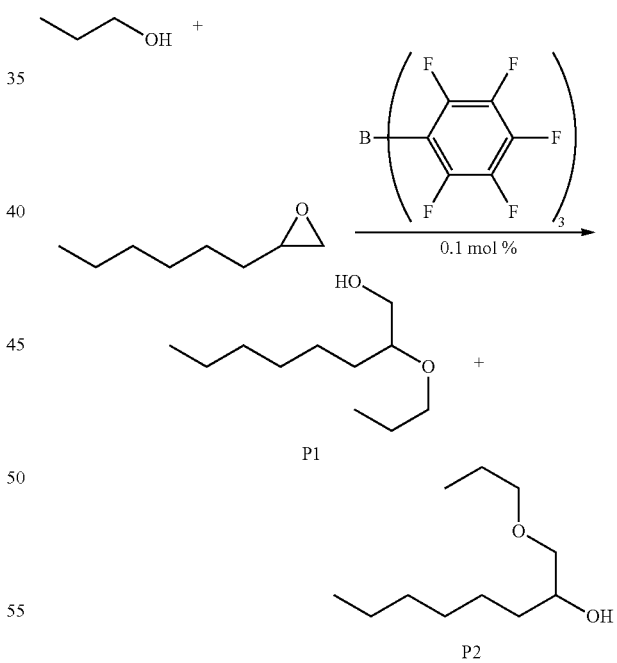

All reactions are performed in the presence of an internal standard (o-xylene) such that the products can be measured quantitatively by gas chromatography.

In particular, Working Examples 1 to 14 and Comparative Examples A to J are prepared in 20-mL glass scintillation vials equipped with PTFE septa. FAB (0.1 mol %) and 5 equivalents (with respect to the FAB) of the additive (except Comparative Example A where no additive is added) are dissolved in 1 mL of o-xylene (internal standard for GC analysis) in the vials which are placed on a Glas-Col benchtop shaker. The vial is equilibrated at 60° C. and shaken at 500 rpm. Then, 1 mL of 1,2-epoxyoctane and 2 mL of 1-propanol are added and shaking is continued until approximately 100% conversion of the 1,2-epoxyoctane is believed to be reached, as determined by gas chromatography analysis. Table 1 provides the additives for Working Examples 1 to 14, and the corresponding first-order reaction constant ($k_{app}$) and selectivity for primary hydroxyl groups relative to secondary hydroxyl groups for each example. Table 2 provides the control Comparative Example A with no additive and comparative additives for Comparative Examples B to J, and the corresponding first-order reaction constant ($k_{app}$) and selectivity for primary hydroxyl groups relative to secondary hydroxyl groups for each example (as a molar ratio).

Referring to Tables 1 and 2, gas chromatography analysis, GC-FID, is carried out using a Shimadzu GC-2014 with a Stabiliwax column for samples of each Example. Samples for analysis are obtained by diluting 50-μL reaction mixture aliquots in 1.5 mL of THF/MTBE (tetrahydrofuran/methyl tert-butyl ether). Signals are calibrated against authentic epoxide and an authentic sample of the primary alcohol-containing product, 2-propoxy-1-octanol, which is synthesized and isolated from 1-propanol alcoholysis of 1,2-epoxyoctane. The primary and secondary alcohol products are assumed to have identical GC-FID response factors. Final selectivities in Tables 1 and 2 are reported at 100% conversion. The first-order reaction constant ($k_{app}$) is calculated from the slope of the concentration vs time curve at less than 15% conversion and divided by the epoxide concentration. The $k_{app}$ is used to show that the additives do not have an adverse effect on catalyst activity, while improving selectivity for primary hydroxyl groups.

All the Working Examples and Comparative Examples provided a good $k_{app}$ (i.e., greater than 1), but only the Working Examples shows an increase in selectivity for primary hydroxyl groups versus secondary hydroxyl groups when the hydrogen bond acceptor (HBA) additive is combined with the Lewis acid polymerization catalyst.

Working Examples 1 to 14 are as follows:

TABLE 1

| | Hydrogen Bond Acceptor Additive | | $k_{app}$ ($10^{-3}$ min$^{-1}$) | Selectivity |
|---|---|---|---|---|
| Ex. 1 | Glycerol | | 12 | 4.4 |
| Ex. 2 | 3-chloro-1,2-propanediol | | 9 | 4.4 |
| Ex. 3 | (+)-cis-Pinanediol | | 7 | 4.4 |
| Ex. 4 | (−)-cis-Pinanediol | | 7 | 4.4 |
| Ex. 5 | 1,2-Propylene Glycol | | 8 | 4.3 |
| Ex. 6 | (S)-(+)-1,2-Propanediol | | 9 | 4.3 |
| Ex. 7 | (R)-(−)-1,2-Propanediol | | 8 | 4.4 |
| Ex. 8 | Octanediol | | 9 | 4.3 |
| Ex. 9 | 1,3-Butanediol | | 9 | 4.3 |

TABLE 1-continued

| | Hydrogen Bond Acceptor Additive | $k_{app}$ ($10^{-3}$ min$^{-1}$) | Selectivity |
|---|---|---|---|
| Ex. 10 | 1,4-Pentanediol | 11 | 4.0 |
| Ex. 11 | Cis-1,2-cyclooctanediol | 9 | 4.4 |
| Ex. 12 | Cis-1,2-Cyclohexanediol | 8 | 4.4 |
| Ex. 13 | Catechol | 10 | 4.3 |
| Ex. 14 | 5-Methylresorcinol | 11 | 3.9 |

Comparative Examples A to J are as follows:

TABLE 2

| | Hydrogen Bond Acceptor Additive | $k_{app}$ ($10^{-3}$ min$^{-1}$) | Selectivity |
|---|---|---|---|
| Ex. A | No Additive | 13 | 3.4 |
| Ex. B | methyl t-butyl ether | 12 | 3.1 |
| Ex. C | dimethylsulfoxide | 7 | 3.4 |
| Ex. D | diphenyl sulfone | 14 | 3.2 |
| Ex. E | dipropylene glycol dimethyl ether (major isomer) | 11 | 3.5 |
| Ex. F | dimethoxyethane | 11 | 3.4 |
| Ex. G | 1-methoxy-2-propanol (major isomer) | 15 | 3.3 |
| Ex. H | 2-methoxyethanol | 13 | 3.5 |
| Ex. I | 1,5-Pentanediol | 16 | 3.6 |

TABLE 2-continued

| | Hydrogen Bond Acceptor Additive | | $k_{app}$ ($10^{-3}$ min$^{-1}$) | Selectivity |
|---|---|---|---|---|
| Ex. J | 1,6-Hexanediol | HO~~~~~~OH | 15 | 3.6 |

Referring to Comparative Example A, when this reaction is run in the absence of any additive, the final selectivity is 3.4. Further, Comparative Examples B to D—Lewis-basic additives—and Comparative Examples E to H—diethers and monofunctional alcohols—have a negligible impact on selectivity. Also, Comparative Examples I and J—linear diols with a hydrocarbon backbone containing OH groups in the 1,5- and 1,6-positions—have a negligible effect on selectivity. In contrast, each of Working Examples 1 to 14—hydrogen bond acceptor (HBA) additives that are a $C_2$ to $C_{20}$ organic molecule having two hydroxyl groups situated at the 1,2-, 1,3-, or 1,4-, positions—provide a significant increase in selectivity.

The invention claimed is:

1. A method of producing a polyether alcohol, the method comprising:
   feeding an initiator into a reactor, the initiator having a nominal hydroxyl functionality of at least 1;
   feeding one or more monomers into the reactor, the one or more monomers being an alkylene oxide;
   feeding a polymerization catalyst into the reactor, the polymerization catalyst being a Lewis acid catalyst having a general formula $M(R^1)_1(R^2)_1(R^3)_1(R^4)_{0 \text{ or } 1}$, whereas M is boron, aluminum, indium, bismuth or erbium, $R^1$, $R^2$, $R^3$, and $R^4$ are each independent, $R^1$ includes a first fluoro/chloro or fluoroalkyl-substituted phenyl group, $R^2$ includes a second fluoro/chloro or fluoroalkyl-substituted phenyl group, $R^3$ includes a third fluoro/chloro or fluoroalkyl-substituted phenyl group or a first functional group or functional polymer group, optional $R^4$ is a second functional group or functional polymer group;
   separate from feeding the initiator into the reactor, feeding a hydrogen bond acceptor additive into the reactor, the hydrogen bond acceptor additive being a $C_2$ to $C_{20}$ organic molecule having at least two hydroxyl groups, of which two hydroxyl groups are situated in 1,2-, 1,3-, or 1,4-positions on the organic molecule; and
   allowing the initiator to react with the one or more monomers in the presence of the polymerization catalyst and the hydrogen bond acceptor additive to form a polyether alcohol having a number average molecular weight greater than a number average molecular weight of the initiator.

2. The method as claimed in claim 1, wherein:
   the polymerization catalyst is fed into the reactor in an amount greater than 0 and less than or equal to 0.005 molar equivalents per mole of the initiator fed into the reactor, and
   the hydrogen bond acceptor additive is fed into the reactor in an amount greater than 0 and less than or equal to 0.25 molar equivalents per mole of the initiator fed into the reactor.

3. The method as claimed in claim 1, wherein the initiator is fed into the reactor through a first line and the hydrogen bond acceptor is fed into the reactor through a second line that is separate and spaced apart from the first line.

4. The method as claimed in claim 1, wherein the hydrogen bond acceptor additive is a $C_3$ to $C_8$ organic molecule.

5. The method as claimed in claim 1, wherein $R^3$ includes the third fluoro/chloro or fluoroalkyl-substituted phenyl group.

6. The method as claimed in claim 1, wherein the first fluoro/chloro or fluoroalkyl-substituted phenyl group and the second fluoro/chloro or fluoroalkyl-substituted phenyl group are the same.

7. The method as claimed in claim 1, wherein $R^3$ includes the third fluoro/chloro or fluoroalkyl-substituted phenyl group and the first fluoro/chloro or fluoroalkyl-substituted phenyl group and the second fluoro/chloro or fluoroalkyl-substituted phenyl group are the same.

8. The method as claimed in claim 1, wherein $R^3$ includes the third fluoro/chloro or fluoroalkyl-substituted phenyl group and the first fluoro/chloro or fluoroalkyl-substituted phenyl group, the second fluoro/chloro or fluoroalkyl-substituted phenyl group, and the third fluoro/chloro or fluoroalkyl-substituted phenyl group are the same.

9. A polyether alcohol produced with the method as claimed in claim 1, the polyether alcohol being a non-finished alcohol.

10. A polyurethane product, comprising a reaction product of the polyether alcohol as claimed in claim 9 and an isocyanate.

* * * * *